(12) United States Patent
Yang

(10) Patent No.: US 10,641,523 B2
(45) Date of Patent: May 5, 2020

(54) CONTROL DEVICE OF WATER HEATING APPARATUS, WATER HEATING APPARATUS AND CONTROL METHOD THEREOF

(71) Applicant: BOE TECHNOLOGY GROUP CO., LTD., Beijing (CN)

(72) Inventor: Caikun Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 128 days.

(21) Appl. No.: 15/562,808

(22) PCT Filed: Apr. 18, 2017

(86) PCT No.: PCT/CN2017/080861
§ 371 (c)(1),
(2) Date: Sep. 28, 2017

(87) PCT Pub. No.: WO2018/000911
PCT Pub. Date: Jan. 4, 2018

(65) Prior Publication Data
US 2018/0283732 A1 Oct. 4, 2018

(30) Foreign Application Priority Data
Jun. 27, 2016 (CN) .......................... 2016 1 0479970

(51) Int. Cl.
*F24H 9/20* (2006.01)
*F24D 19/10* (2006.01)
(Continued)

(52) U.S. Cl.
CPC ....... *F24H 9/2007* (2013.01); *F24D 19/1054* (2013.01); *G05B 13/042* (2013.01);
(Continued)

(58) Field of Classification Search
None
See application file for complete search history.

(56) References Cited

U.S. PATENT DOCUMENTS 8,065,097 B2   11/2011   Kato et al.

FOREIGN PATENT DOCUMENTS

| CA | 2688664 C | 4/2014 |
|---|---|---|
| CN | 102374645 A | 3/2012 |

(Continued)

OTHER PUBLICATIONS

International Search Report dated Jun. 29, 2017 in corresponding International Application No. PCT/CN2017/080861 along with an English translation of the International Search Report and an English translation of the Written Opinion of the International Searching Authority.
(Continued)

*Primary Examiner* — Carlos R Ortiz Rodriguez
(74) *Attorney, Agent, or Firm* — Nath, Goldberg & Meyer; Joshua B. Goldberg

(57) ABSTRACT

The present disclosure provides a control device of a water heating apparatus, a water heating apparatus and a control method thereof. The control device comprises a storage, a processor and a heater, the storage stores a usage state value of the water heating apparatus during a first period and provides the usage state value to the processor connected thereto, the usage state value includes a mean value of outlet water temperature $T_H$, a mean value of outlet water amount $L_U$ and a mean value of inlet water temperature $T_L$, the processor determines an output value in accordance with the usage state value and provides the output value to the heater connected thereto, the output value includes a water amount $L_X$ to be heated and a water temperature T to be reached, the
(Continued)

heater performs heating during a second period in accordance with the output value from the processor.

19 Claims, 5 Drawing Sheets

(51) Int. Cl.
    *H04W 4/80*         (2018.01)
    *G05B 13/04*       (2006.01)
    *G06F 3/16*         (2006.01)

(52) U.S. Cl.
    CPC ............... *G06F 3/16* (2013.01); *H04W 4/80* (2018.02); *F24D 2220/042* (2013.01); *F24D 2220/044* (2013.01)

(56) References Cited

FOREIGN PATENT DOCUMENTS

| | | | |
|---|---|---|---|
| CN | 103363670 | A | 10/2013 |
| CN | 104110878 | A | 10/2014 |
| CN | 105020898 | A | 11/2015 |
| CN | 204880702 | U | 12/2015 |
| CN | 105352189 | A | 2/2016 |
| CN | 105571140 | A | 5/2016 |
| CN | 105650886 | A | 6/2016 |
| CN | 105698397 | A | 6/2016 |
| CN | 106052140 | A | 10/2016 |
| JP | 2008157502 | A | 7/2008 |

OTHER PUBLICATIONS

First Office Action CN201610479970.3 dated Aug. 1, 2018 and Translation Document.

CONTROL DEVICE OF WATER HEATING APPARATUS, WATER HEATING APPARATUS AND CONTROL METHOD THEREOF

CROSS-REFERENCE TO RELATED APPLICATION

This is a National Phase Application filed under 35 U.S.C. 371 as a national stage of PCT/CN2017/080861, filed Apr. 18, 2017, an application claiming the benefit of Chinese Application No. 201610479970.3, filed Jun. 27, 2016, the content of each of which is hereby incorporated by reference in its entirety.

TECHNICAL FIELD

The present disclosure relates to the control field of a water heating apparatus, and particularly, to a control device of a water heating apparatus, a water heating apparatus and a control method thereof.

BACKGROUND

Currently, a heating control device of a water heating apparatus is becoming more and more intelligent, for example, an adaptive energy-saving (AES) control device is used in the water heating apparatus on the market now, however, the current control device of the water heating apparatus only collects a usage timing of a user so as to heat water in advance to a particular temperature, a water consumption amount and a usage time duration of the user are not accurately calculated, and a heat preservation state in an idle time is not advantageous to save electric energy, moreover, the current heating control device has a complex structure, resulting in a high cost.

SUMMARY

An embodiment of the present disclosure provides a control device of a water heating apparatus, and the control device comprises a storage, a processor and a heater, wherein, the storage is configured to store a usage state value of the water heating apparatus during a first period and provide the usage state value to the processor connected thereto, the usage stage value includes a mean value of outlet water temperature $T_H$, a mean value of outlet water amount $L_U$ and a mean value of inlet water temperature $T_L$, the processor is configured to determine an output value in accordance with the usage state value and provide the output value to the heater connected thereto, the output value includes a water amount $L_X$ to be heated and a water temperature T to be reached, the heater is configured to perform heating during a second period in accordance with the output value from the processor.

In an embodiment of the present disclosure, the processor comprises:

a comparing part configured to determine a range of $L_U/L$, wherein, L represents a water tank capacity of the water heating apparatus; and a water amount determining part configured to determine water amount $L_X$ to be heated in accordance with the range of $L_U/L$ determined by the comparing part.

In an embodiment of the present disclosure, the water amount determining part is configured to determine a first water amount as the water amount $L_X$ to be heated under the condition that $L_U/L$ is less than a first threshold, determine a second water amount as the water amount $L_X$ to be heated under the condition that $L_U/L$ is larger than the first threshold and less than a second threshold, or determine a third water amount as the water amount $L_X$ to be heated under the condition that $L_U/L$ is larger than the second threshold, wherein, the first threshold is less than the second threshold.

In an embodiment of the present disclosure, the water amount determining part comprises a divider, a first comparator, a second comparator, a first inverter, a second inverter, and a logic AND circuit, wherein, input terminals of the divider are connected to the storage to receive $L_U$ and L, and $L_U/L$ is output from the divider, an output terminal of the divider is connected to an inverting input terminal of the first comparator and an non-inverting input terminal of the second comparator, an non-inverting input terminal of the first comparator receives the first threshold as an input value thereof, the first comparator is configured to output a value of 1 under the condition that a value of $L_U/L$ is less than the first threshold, an inverting input terminal of the second comparator receives the second threshold as an input value thereof, the second comparator is configured to output the value of 1 under the condition that the value of $L_U/L$ is larger than the second threshold, output terminals of the first comparator and the second comparator are respectively connected to input terminals of the first inverter and the second inverter, output terminals of the first inverter and the second inverter are connected to the logic AND circuit, and the logic AND circuit is configured to output the value of 1 under the condition that the value of $L_U/L$ is larger than the first threshold and less than the second threshold.

In an embodiment of the present disclosure, the water amount determining part further comprises a first multiplier and a first relay, a second multiplier and a second relay, and a third multiplier and a third relay, wherein, a first input terminal of the first relay is connected to an output terminal of the first multiplier, the first multiplier outputs a value of the first water amount, a second input terminal of the first relay is connected to the output terminal of the first comparator, the water amount determining part is configured to output the value of the first water amount under the condition that the value of $L_U/L$ is less than the first threshold, a first input terminal of the second relay is connected to an output terminal of the second multiplier, the second multiplier outputs a value of the second water amount, a second input terminal of the second relay is connected to an output terminal of the logic AND circuit, the water amount determining part is configured to output the value of the second water amount under the condition that the value of $L_U/L$ is larger than the first threshold and less than the second threshold, a first input terminal of the third relay is connected to an output terminal of the third multiplier, the third multiplier outputs a value of the third water amount, a second input terminal of the third relay is connected to an output terminal of the second comparator, the water amount determining part is configured to output the value of the third water amount under the condition that the value of $L_U/L$ is larger than the second threshold.

In an embodiment of the present disclosure, the processor further comprises a water temperature determining part configured to determine the water temperature $T=(T_H-T_L) L_U/L_X, T_L$ to be reached.

In an embodiment of the present disclosure, the water temperature determining part comprises a subtractor, a multiplier, a divider and an adder, wherein, input terminals of the subtractor are connected to the storage to receive $T_H$ and $T_L$, a value of $T_H-T_L$ is output from the subtractor, a first input terminal of the multiplier is connected to an output terminal of the subtractor to receive the value of $T_H-T_L$, a second input terminal of the multiplier is connected to the storage to receive a value of $L_U$, the multiplier is configured to output a value of $(T_H-T_L)L_U$, a first input terminal of the divider is connected to an output terminal of the multiplier to receive the value of $(T_H-T_L)L_U$, a second input terminal of the divider is connected to the water amount determining part to receive $L_X$, and the divider is configured to output a value of $(T_H-T_L)L_U/L_X$, a first input terminal of the adder is connected to an output terminal of the divider to receive the value of $(T_H-T_L)L_U/L_X$, a second input terminal of the adder receives $T_L$, and the adder is configured to output the water temperature $T=(T_H-T_L)L_U/L_X+T_L$.

In an embodiment of the present disclosure, the storage being configured to store the usage state value of the water heating apparatus during the first period may specifically include storing usage state values of the water heating apparatus every day during continuous N days, the heater being configured to perform heating during the second period in accordance with the output value from the processor may specifically include performing heating at $(N+1)^{th}$ day, or from $(N+1)^{th}$ day to $(N+Z)^{th}$ day, and wherein N is a positive integer and Z is an integer larger than 1.

In an embodiment of the present disclosure, the storage is configured to further store start timings t at which a user starts to use hot water every day during the continuous N days and provide the start timings $t_u$ to the processor, the processor is configured to determine a mean value $t_u$ of the starting timings t and provide the mean value $t_u$ to the storage, the storage stores the mean value $t_u$, and the processor is configured to receive $t_u$ transmitted from the storage, determine a heating start timing $(t_u-\Delta_t)$ at $(N+1)^{th}$ day and provide it to the heater, and wherein $\Delta_t$ is a time required to perform heating.

In an embodiment of the present disclosure, the heater is configured to perform heating at $(N+1)^{th}$ day in accordance with the output value from the processor, and the output value from the processor is determined in accordance with the usage state values of the water heating apparatus stored from a first day to $N^{th}$ day.

In an embodiment of the present disclosure, the control device further comprising:

a detector which includes a first temperature sensor and a water flow sensor provided at a water outlet of the water heating apparatus, and a second temperature sensor provided at a water inlet of the water heating apparatus.

In an embodiment of the present disclosure, the first temperature sensor is configured to detect outlet water temperatures of the water heating apparatus every day during continuous N days and convert them into a first set of electric signals, the water flow sensor is configured to detect outlet water amount values of the water heating apparatus every day during the continuous N days and convert them into a second set of electric signals, the second temperature sensor is configured to detect inlet water temperatures of the water heating apparatus every day during the continuous N days and convert them into a third set of electric signals, the detector is configured to provide the first set of electric signals, the second set of electric signals and the third set of electric signals to the storage, the processor is configured to receive the first set of electric signals, the second set of electric signals and the third set of electric signals transmitted from the storage, determine the mean value of outlet water temperature $T_H$, the mean value of outlet water amount $L_U$ and the mean value of inlet water temperature $T_L$ of the water heating apparatus, and feedback them to the storage so that the storage stores them.

An embodiment of the present disclosure further provides a water heating apparatus comprising the control device described above.

In an embodiment of the present disclosure, the water heating apparatus further comprises:

a display connected to the storage, which is configured to receive and display the usage state value of the water heating apparatus stored in the storage, wherein the usage state value of the water heating apparatus includes a current outlet water temperature and an available usage time of remaining hot water of the water heating apparatus.

In an embodiment of the present disclosure, the water heating apparatus further comprises:

a Bluetooth transmitter connected to the storage, which is connected to an external terminal and configured to receive a media file transmitted from the external terminal and provide it to the storage;

an audio player connected to the storage, which is configured to receive and play the media file transmitted from the storage, wherein, the display is configured to further receive and display the media file transmitted from the storage.

An embodiment of the present disclosure further provides a control method of a water heating apparatus, comprising steps of:

acquiring a mean value of outlet water temperature $T_H$, a mean value of outlet water amount $L_U$ and a mean value of inlet water temperature $T_L$ of the water heating apparatus during a first period;

determining a water amount $L_X$ to be heated during a second period in accordance with the mean value of outlet water amount $L_U$ and a water tank capacity L of the water heating apparatus; and determining a water temperature T to be reached during the second period in accordance with the water amount $L_X$ to be heated, the mean value of outlet water temperature $T_H$, the mean value of outlet water amount $L_U$ and the mean value of inlet water temperature $T_L$.

In an embodiment of the present disclosure, the step of determining the water amount $L_X$ to be heated during the second period in accordance with the mean value of outlet water amount $L_U$ and the water tank capacity L of the water heating apparatus may specifically include:

determining a first water amount as the water amount $L_X$ to be heated under the condition that a value of $L_U/L$ is less than a first threshold;

determining a second water amount as the water amount $L_X$ to be heated under the condition that the value of $L_U/L$ is larger than the first threshold and less than a second threshold; or determining a third water amount as the water amount $L_X$ to be heated under the condition that the value of $L_U/L$ is larger than the second threshold, wherein, the first threshold is less than the second threshold.

In an embodiment of the present disclosure, the step of determining the water temperature T to be reached during the second period in accordance with the water amount $L_X$ to be heated, the mean value of outlet water temperature $T_H$, the mean value of outlet water amount $L_U$ and the mean value of inlet water temperature $T_L$ includes:

determining the water temperature $T=(T_H-T_L)L_U/L_X+T_L$.

In an embodiment of the present disclosure, the control method further comprises steps of:

acquiring start timings t at which a user starts to use hot water every day during the continuous N days and determining a mean value $t_u$ of the starting timings t; and determining a heating start timing $(t_u-\Delta_t)$ at $(N+1)^{th}$ day and performing heating from it at $(N+1)^{th}$ day, wherein $\Delta_t$ a time required to perform heating.

DESCRIPTION OF EMBODIMENTS

In order to make a person skilled in the art understand technical solutions of the present disclosure better, the present disclosure will be described in detail below in conjunction with accompanying drawings and specific embodiments.

Figure 1:
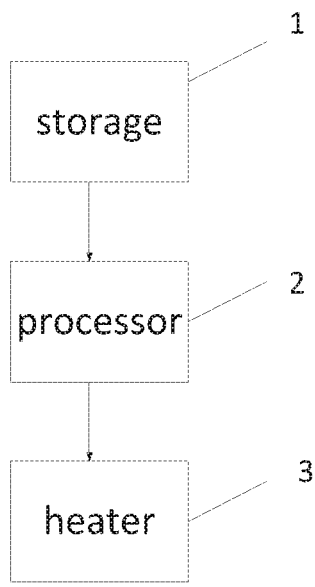
FIG. 1 shows a structural diagram of a control device of a water heating apparatus in accordance with an embodiment of the present disclosure.

FIG. 1 shows a structural diagram of a control device of a water heating apparatus in accordance with an embodiment of the present disclosure. As shown in FIG. 1, an embodiment of the present disclosure provides a control device of a water heating apparatus, and the control device comprises a storage 1, a processor 2 and a heater 3. The storage 1 stores a usage state value of the water heating apparatus during a first period and provides the usage state value to the processor 2 connected thereto, and the usage state value includes a mean value of outlet water temperature $T_H$, a mean value of outlet water amount $L_U$ and a mean value of inlet water temperature $T_L$. The processor 2 determines an output value in accordance with the usage state value and provides the output value to the heater 3 connected thereto, the output value includes a water amount $L_X$ to be heated and a water temperature T to be reached. The heater 3 performs heating during a second period in accordance with the output value from the processor 2.

In an embodiment of the present disclosure, the storage 1 refers to a circuit in an integrated circuit, which has a storage function, and the storage 1 includes a memory bank (i.e., an array consisting of a lot of memories), a necessary address decoder and a read-write control circuit, and optionally, further includes an I/O interface and additional circuits such as an access policy management circuit.

In an embodiment of the present disclosure, the storage 1 may be a flash, a hard disk, a solid-state disk, or any other device with a data storage function.

In an embodiment of the present disclosure, the storage 1 may be integrated into the processor 2 connected thereto, or may be provided outside the processor 2 independently and then connected to an input terminal of the processor 2. FIG. 1 only shows a case where the storage 1 is provided outside the processor 2 independently.

Figure 2:
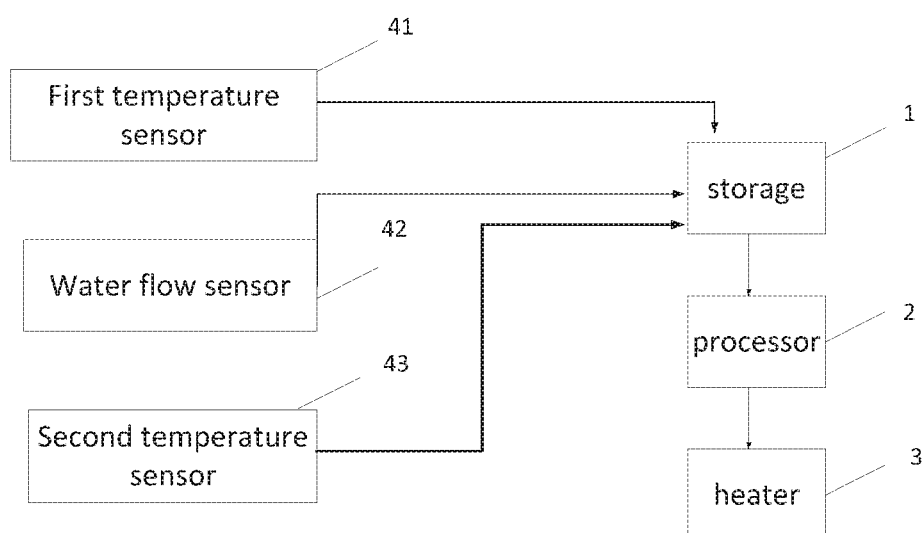
FIG. 2 shows a structural diagram of another control device of a water heating apparatus in accordance with an embodiment of the present disclosure.

FIG. 2 shows a structural diagram of another control device of a water heating apparatus in accordance with an embodiment of the present disclosure. As shown in FIG. 2, on a basis of the control device of FIG. 1, in the control device of FIG. 2, an input terminal of the storage 1 is connected to a first temperature sensor 41 provided at a water outlet of the water heating apparatus, a water flow sensor 42 provided at the water outlet of the water heating apparatus and a second temperature sensor 43 provided at an water inlet of the water heating apparatus to receive an outlet water temperature detected and transmitted during the first period by the first temperature sensor 41 at the water outlet of the water heating apparatus, an outlet water amount detected and transmitted by the water flow sensor 42 at the water outlet of the water heating apparatus, and an inlet water temperature detected and transmitted by the second temperature sensor 43 at the water inlet of the water heating apparatus respectively. In the present embodiment, the first period may be a period of time preset in advance, for example, may be 30 days, and in this case, the input terminal of the storage 1 receives outlet water temperature values, outlet water amount values and inlet water temperature values of the water heating apparatus every day during 30 days when a user uses the water heating apparatus, and a sum of the received outlet water temperature values is calculated and divided by a usage times, a sum of the received outlet water amount values is calculated and divided by the usage times, and a sum of the received inlet water temperature values is calculated and divided by the usage times, so that the mean value of outlet water temperature $T_H$, the mean value of outlet water amount $L_U$, and a mean value of inlet water temperature $T_L$ are determined.

In an embodiment of the present disclosure, each of the first temperature sensor 41 at the water outlet of the water heating apparatus, the water flow sensor 42 at the water outlet of the water heating apparatus and the second temperature sensor 43 at the water inlet of the water heating apparatus has a usage state collecting circuit and an analog-to-digital conversion circuit so that it can convert a detected analog signal into a digital signal and output the digital signal to the storage 1.

In an embodiment of the present disclosure, the processor 2 refers to an integrated circuit with an arithmetic and control function, and it may be a very large scale integrated circuit such as a CPU, or may be a single chip such as a 8-bit single chip AT89C52, the storage 1 may be integrated in the CPU or the single chip, or may be provided outside the CPU or the single chip independently to provide data stored therein to the CPU or the single chip.

In an embodiment of the present disclosure, the processor 2 connected to the storage 1 receives the usage state value provided by the storage 1, and determines an output value in accordance with the usage state value and provides the output value to the heater 3, wherein the usage state value provided by the storage 1 includes the mean value of outlet water temperature $T_H$, the mean value of outlet water amount $L_U$ and the mean value of inlet water temperature $T_L$, and the output value of the processor 2 includes the water amount $L_X$ to be heated and the water temperature T to be reached.

In an embodiment of the present disclosure, the heater 3 may be an electric heater in which a metal gives out heat due to an eddy current generated in an alternating magnetic field so that electric energy is converted into heat energy. Alternatively, the heater 3 also may be a solar heater which absorbs solar radiation to perform heating. As another option, the heater 3 may be a gas water heater which performs heating by burning gas.

In an embodiment of the present disclosure, the heater 3 performs heating during the second period in accordance with the output value of the processor 2, and the second period is a period of time subsequent to the first period. For example, the second period may be a period of time preset in advance, a duration of the second period may be equal to a duration of the first period, that is, the duration of the first period is a cycle (e.g., when the first period is 30 days, the second period may be a duration from the thirty-first day to the sixtieth day), or the second period may be a day subsequent to the first period (e.g., when the first period is 30 days, the second period is the thirty-first day).

In an embodiment of the present disclosure, the heater 3 may heat water to a temperature $T+\Delta T$, wherein $T$ refers to the water temperature $T$ in the output value of the processor 2, $\Delta T$ may refer to a preset value, that is, an actual water temperature reached by heating of the heater 3 is higher than the water temperature $T$ in the output value of the processor 2 by $\Delta T$ so that the user can use hot water abundantly.

The control device of the water heating apparatus provided by the embodiment of the present disclosure has a simple structure, resulting in a low control cost, and can make the water heating apparatus to achieve intelligent heating in timing and quantitative way, which is user-friendly.

Figure 3:
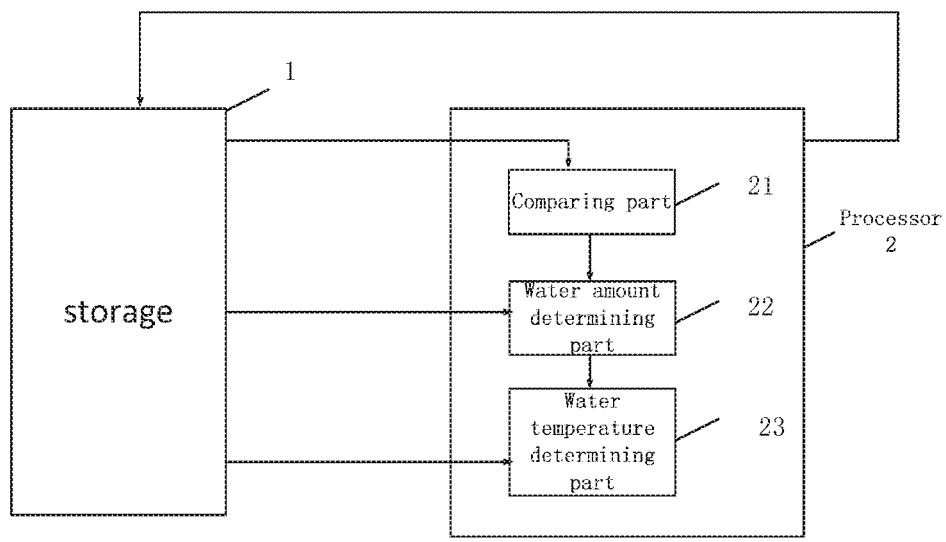
FIG. 3 shows a structural diagram of a processor in accordance with an embodiment of the present disclosure.

FIG. 3 shows a structural diagram of a processor in accordance with an embodiment of the present disclosure. As shown in FIG. 3, the processor 2 may specifically include a comparing part 21, a water amount determining part 22 and a water temperature determining part 23, in addition to be the CPU or the single chip mentioned above.

In an embodiment of the present disclosure, the comparing part 21 is configured to determine a range of $L_U/L$, wherein $L_U$ refers to the mean value of outlet water amount in the output value of the processor 2, L refers to a water tank capacity of the water heating apparatus. The range of $L_U/L$ includes a value of $L_U/L$ being less than a first threshold, the value of $L_U/L$ being larger than the first threshold and less than a second threshold, and the value of $L_U/L$ being larger than the second threshold, wherein the first threshold is less than the second threshold. The water amount determining part 22 is configured to determine the water amount $L_X$ to be heated in accordance with the range of $L_U/L$ determined by the comparing part 21, and the water amount $L_X$ may be of a particular value (e.g., a first water amount, a second water amount or a third water amount). Specifically, under the condition that $L_U/L$ is less than the first threshold, the first water amount is used as the water amount $L_X$ to be heated, under the condition that $L_U/L$ is larger than the first threshold and less than the second threshold, the second water amount is used as the water amount $L_X$ to be heated, and under the condition that $L_U/L$ is larger than the second threshold, the third water amount is used as the water amount $L_X$ to be heated. For example, under the condition that $L_U/L$ is less than 0.5, the water amount $L_X$ to be heated is $0.25 \cdot L$, under the condition that $L_U/L$ is larger than 0.5 and less than 1, the water amount $L_X$ to be heated is $0.5 \cdot L$, and under the condition that $L_U/L$ is larger than 1, the water amount $L_X$ to be heated is $1 \cdot L$. According to the conservation principle of heat (i.e., $L_U \cdot (T_H - T_L) = L_X \cdot (T - T_L)$), the water temperature determining part 23 is configured to determine the water temperature $T = (T_H - T_L) L_U / L_X + T_L$ to be reached in accordance with the mean value of outlet water temperature $T_H$, the mean value of outlet water amount $L_U$ and the mean value of inlet water temperature $T_L$ received from the storage 1.

Figure 4:
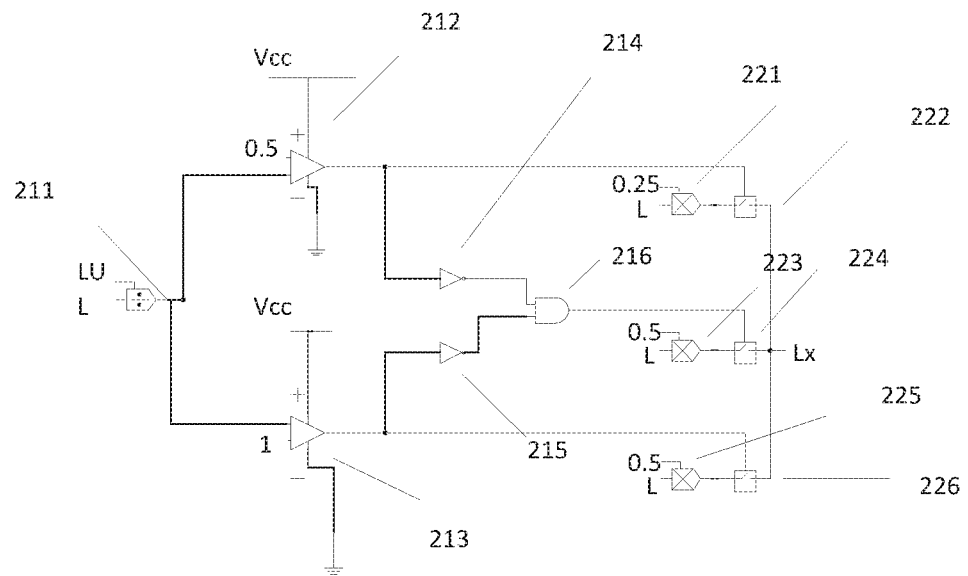
FIG. 4 shows a structural diagram of another processor in accordance with an embodiment of the present disclosure.

FIG. 4 shows a structural diagram of another processor in accordance with an embodiment of the present disclosure. As shown in FIG. 4, the comparing part 21 may include a divider 211, a first comparator 212, a second comparator 213, a first inverter 214, a second inverter 215 and a logic AND circuit 216. Input terminals of the divider 211 are connected to the storage 1 to receive the mean value of outlet water amount $L_U$ provided by the storage 1 and further receive a water tank capacity of the water heating apparatus L, $L_U/L$ is output from the divider 211, and an output terminal of the divider 211 is connected to an inverting input terminal of the first comparator 212 and an non-inverting input terminal of the second comparator 213.

In an embodiment of the present disclosure, under the condition that $L_U/L$ is less than 0.5, the water amount $L_X$ to be heated is $0.25 \cdot L$, under the condition that $L_U/L$ is larger than 0.5 and less than 1, the water amount $L_X$ to be heated is $0.5 \cdot L$, and under the condition that $L_U/L$ is larger than 1, the water amount $L_X$ to be heated is $1 \cdot L$. In this case, a value of 0.5 is input into an non-inverting input terminal of the first comparator 212, a value of 1 is input into an inverting input terminal of the second comparator 213, under the condition that $L_U/L$ is less than 0.5, the first comparator 212 outputs a value of 1, under the condition that $L_U/L$ is larger than 1, the second comparator 213 outputs a value of 1.

Output terminals of the first comparator 212 and the second comparator 213 are respectively connected to input terminals of the first inverter 214 and the second inverter 215, output terminals of the first inverter 214 and the second inverter 215 are connected to two input terminals of the logic AND circuit 216 respectively, under the condition that $L_U/L$ is larger than 0.5 and less than 1, the logic AND circuit 216 outputs a value of 1.

Thus, an output control for the comparing part may be achieved according to the range of $L_U/L$.

As show in FIG. 4, the water amount determining part 22 may comprise a first multiplier 221 and a first relay 222, a second multiplier 223 and a second relay 224, and a third multiplier 225 and a third relay 226.

In an embodiment of the present disclosure, under the condition that $L_U/L$ is less than 0.5, the water amount $L_X$ to be heated is $0.25 \cdot L$, under the condition that $L_U/L$ is larger than 0.5 and less than 1, the water amount $L_X$ to be heated is $0.5 \cdot L$, and under the condition that $L_U/L$ is larger than 1, the water amount $L_X$ to be heated is $1 \cdot L$. In this case, a first input terminal of the first relay 222 is connected to an output terminal of the first multiplier 221, the first multiplier 221 outputs a value of $0.25 \cdot L$, a second input terminal of the first relay 222 is connected to the output terminal of the first comparator 212, the water amount determining part 22 outputs the value of $0.25 \cdot L$ under the condition that the value of $L_U/L$ is less than 0.5.

A first input terminal of the second relay 224 is connected to an output terminal of the second multiplier 223, the second multiplier 223 outputs a value of $0.5 \cdot L$, a second input terminal of the second relay 224 is connected to an output terminal of the logic AND circuit 216, the water amount determining part 22 outputs the value of $0.5 \cdot L$ under the condition that the value of $L_U/L$ is larger than 0.5 and less than 1.

A first input terminal of the third relay 226 is connected to an output terminal of the third multiplier 225, the third multiplier 225 outputs a value of 1·L, a second input terminal of the third relay 226 is connected to an output terminal of the second comparator 213, the water amount determining part 22 outputs the value of 1·L under the condition that the value of $L_U/L$ is larger than 1.

Thus, a control of various water amounts $L_X$ to be heated is achieved according to the range of $L_U/L$.

It should be understood that, an example in which the first threshold is 0.5, the second threshold is 1, the first water amount is 0.25·L, the second water amount is 0.5·L and the third water amount is 1·L is described above, but the present disclosure is not limited thereto, values of the first threshold, the second threshold, the first water amount, the second water amount and the third water amount may be set as required.

Figure 5:
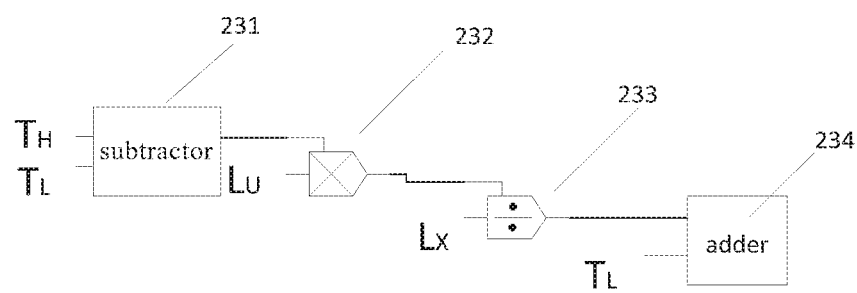
FIG. 5 shows a structural diagram of still another processor in accordance with an embodiment of the present disclosure.

FIG. 5 shows a structural diagram of a processor in an embodiment of the present disclosure. As shown in FIG. 5, the water temperature determining part 23 may comprise a subtractor 231, a multiplier 232, a divider 233 and an adder 234.

Input terminals of the subtractor 231 are connected to the storage 1 to receive the mean value of outlet water temperature $T_H$ and the mean value of inlet water temperature $T_L$, a value of $T_H - T_L$ is output from the subtractor 231.

A first input terminal of the multiplier 232 is connected to an output terminal of the subtractor 231 to receive the value of $T_H - T_L$ output from the subtractor 231, a second input terminal of the multiplier 232 is connected to the storage 1 to receive the mean value of outlet water amount $L_U$, the multiplier 232 outputs a value of $(T_H - T_L)L_U$.

A first input terminal of the divider 233 is connected to an output terminal of the multiplier 232 to receive the value of $(T_H - T_L)L_U$ output from the multiplier 232, a second input terminal of the divider 233 is connected to the water amount determining part 22 to receive the water amount $L_X$ to be heated determined by the water amount determining part 22, and the divider 233 outputs a value of $(T_H - T_L)L_U/L_X$.

A first input terminal of the adder 234 is connected to an output terminal of the divider 233 to receive the value of $(T_H - T_L)L_U/L_X$ output from the divider 233, a second input terminal of the adder 234 receives the mean value of inlet water temperature $T_L$, and the adder 234 outputs the water temperature $T = (T_H - T_L)L_U/L_X + T_L$ to be reached.

Thus, an output control of water temperature to be reached is achieved by detecting the mean value of outlet water temperature $T_H$, the mean value of outlet water amount $L_U$ and the mean value of inlet water temperature $T_L$.

In an embodiment of the present disclosure, the storage 1 being configured to store the usage state value of the water heating apparatus during the first period may include storing usage state values of the water heating apparatus every day during continuous N days, the heater 3 performs heating during the second period in accordance with the output value from the processor 2.

For example, heating may be performed at $(N+1)^{th}$ day, or from $(N+1)^{th}$ day to $(N+Z)^{th}$ day in accordance with the output value from the processor 2, and wherein N is a positive integer and Z is an integer larger than 1.

For example, the second period may be a period of time preset in advance, a duration of the second period may be equal to a duration of the first period, that is, the duration of the first period is a cycle (e.g., when the first period is 30 days, the second period may be a duration from the thirty-first day to the sixtieth day), or the second period may be a day subsequent to the first period (e.g., when the first period is 30 days, the second period is the thirty-first day).

For example, when the second period is $(N+1)^{th}$ day (i.e., the heater 3 performs heating at $(N+1)^{th}$ day according to the output value from the processor 2), before $(N+1)^{th}$ day, whenever the user finished using the water heating apparatus every day, the processor 2 detects the usage information for the day and converts it into the usage state value, and then the usage state value is stored into the storage 1 so that an intelligent heating can be performed at $(N+1)^{th}$ day according to the usage state values of the previous N days.

For example, when the heater 3 being configured to perform heating during the second period in accordance with the output value from the processor 2 includes performing heating at $(N+1)^{th}$ day, the processor 2 detects the usage information at $(N+1)^{th}$ day and converts it into the usage state value, the usage state value is stored in the storage 1, and in this case, the usage state value at the first day is deleted from the storage 1, the usage state values of other days are moved forward one day to be stored, thus the intelligent heating still can be performed at $(N+2)^{th}$ day according to the usage state values of the previous N days.

For example, when heating during the second period includes heating at $(N+Z)^{th}$ day, from $(N+1)^{th}$ day to $(N+Z)^{th}$ day, whenever the user finished using the water heating apparatus every day, the processor 2 detects the usage information for the day and converts it into the usage state value, and then the usage state values during continuous Z days are stored into the storage 1, and in this case, the usage state values from the first day to $Z^{th}$ day are deleted from the storage 1, the usage state values of other days are moved forward Z days to be stored, thus the intelligent heating still can be performed after $(N+Z)^{th}$ day according to the usage state values of the previous N days.

In an embodiment of the present disclosure, the storage 1 may further store start timings t at which the user starts to use hot water every day during the continuous N days and provides the start timings t to the processor 2, the processor 2 determines a mean value $t_u$ of the starting timings t and provides the mean value $t_u$ to the storage 1, the storage 1 stores the mean value $t_u$, and the processor 2 receives the mean value $t_u$ of the starting timings t, at which the user starts to use hot water every day, transmitted from the storage 1, determines a heating start timing $(t_u - \Delta_t)$ at $(N+1)^{th}$ day and provides it to the heater 3, and wherein $\Delta_t$ is a time required to perform heating.

In an embodiment of the present disclosure, the processor 2 may comprise a timing circuit for recording the start timing at which the user starts to use hot water, for example, the processor 2 records the starting timings, at which the user starts to use hot water every day, for 30 days, and calculates the mean value $t_u$ (e.g., 21:00) of the starting timings at which the user starts to use hot water every day, the processor 2 determines the time $\Delta_t$ (e.g., 0.5 hour) required to perform heating according to a heating power of the water heating apparatus, the water amount $L_X$ to be heated and the water temperature T to be reached, thus, for example, the heater 3 may start to perform heating from 20:30 at $(N+1)^{th}$ day, from the time at which the heating is completed to the time at which the hot water is started to be used, a heat preservation circuit is turned on, and after finishing using the hot water, the heat preservation circuit is turned off, the water heating apparatus goes into a sleep or standby mode to save power consumption.

In an embodiment of the present disclosure, when the heater 3 performs heating at $(N+1)^{th}$ day, according to the stored usage state values from the first day to $N^{th}$ day, the heater 3 performs heating at the (N+1)$^{th}$ day in accordance with the output value from the processor 2.

Figure 6:
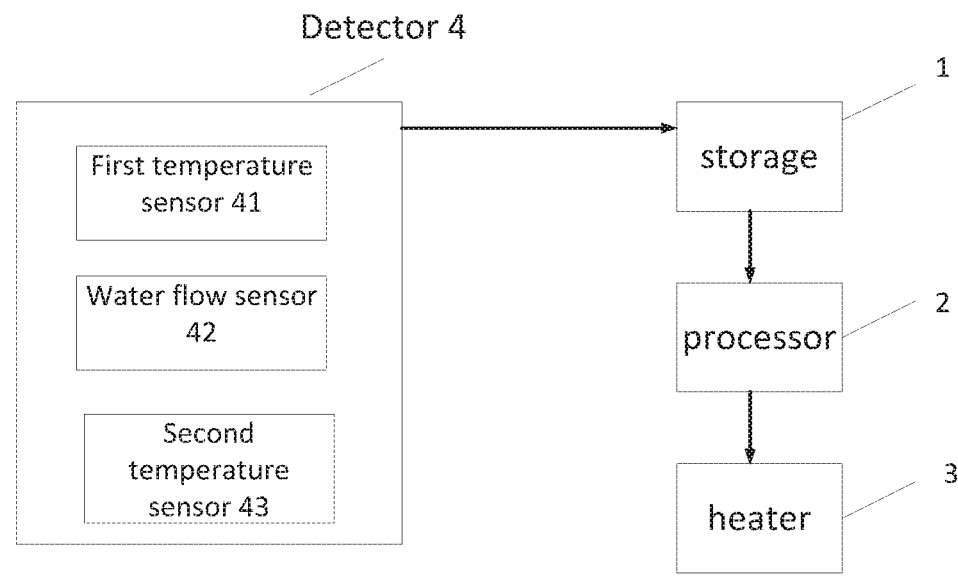
FIG. 6 shows a structural diagram of still another control device of a water heating apparatus in accordance with an embodiment of the present disclosure.

FIG. 6 shows a structural diagram of another control device of a water heating apparatus in an embodiment of the present disclosure. As shown in FIG. 6, the control device of the water heating apparatus may comprise a detector 4 connected to the storage 1, the detector 4 includes a first temperature sensor 41 and a water flow sensor 42 which are provided at a water outlet of the water heating apparatus, and a second temperature sensor 43 provided at a water inlet of the water heating apparatus.

The first temperature sensor 41 detects outlet water temperatures of the water heating apparatus every day during continuous N days and convert them into a first set of electric signals, the water flow sensor 42 detects outlet water amount values of the water heating apparatus every day during the continuous N days and convert them into a second set of electric signals, the second temperature sensor 43 detects inlet water temperatures of the water heating apparatus every day during the continuous N days and convert them into a third set of electric signals, the detector 4 provides the first set of electric signals, the second set of electric signals and the third set of electric signals to the storage 1.

The processor 2 receives the first set of electric signals, the second set of electric signals and the third set of electric signals transmitted from the storage 1, determines the mean value of outlet water temperature $T_H$, the mean value of outlet water amount $L_U$ and the mean value of inlet water temperature $T_L$ of the water heating apparatus, and feedbacks them to the storage 1.

The detector 4 may comprise a storage circuit and an analog-to-digital conversion circuit so that the detector 4 can convert a detected analog signal into a digital signal and output the digital signal to the storage 1.

For example, when N is 10, the detector 4 converts the detected outlet water temperatures of the water heating apparatus during continuous 10 days into the first set of electric signals, converts the outlet water amount values of the water heating apparatus during the continuous 10 days into the second set of electric signals, converts the inlet water temperatures of the water heating apparatus during the continuous 10 days into the third set of electric signals, the first set of electric signals include ten electric signals respectively representing the outlet water temperatures of the water heating apparatus from the first day to the tenth day, the second set of electric signals include ten electric signals respectively representing the outlet water amount values of the water heating apparatus from the first day to the tenth day, and the third set of electric signals include ten electric signals respectively representing the inlet water temperatures of the water heating apparatus from the first day to the tenth day.

It should be noted that, in a case of a first use of the water heating apparatus, there is no usage state value stored in the storage 1, thus usage state values of a corresponding period may be pre-stored in the storage 1. For example, it is assumed that the first period is 30 days, thus usage state values of 30 days may be pre-stored in the storage 1. Alternatively, the heater 3 may work in accordance with a preset mode for the first time during the first period, thus performs heating in accordance with the output value from the processor 2 during the second period. In addition, the first period may be set according to practical applications.

Based on the same concept, the present disclosure further provides a water heating apparatus comprising the control device described above.

Figure 7:
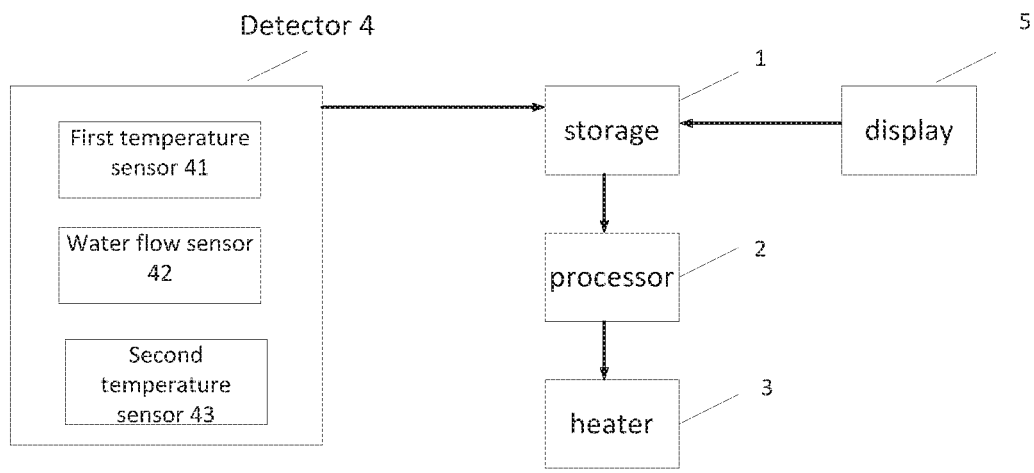
FIG. 7 shows a structural diagram of a water heating apparatus in accordance with an embodiment of the present disclosure.

FIG. 7 shows a structural diagram of a water heating apparatus in an embodiment of the present disclosure. As shown in FIG. 7, the water heating apparatus of the present embodiment may further comprise a display 5 connected to the storage 1, the display 5 receives the usage state values of the water heating apparatus stored in the storage 1 to display them, and the usage state values of the water heating apparatus include a current outlet water temperature and an available usage time of remaining hot water of the water heating apparatus.

The display 5 may comprise a display control circuit, a display drive circuit and a liquid crystal display screen. The display control circuit is connected to the storage 1 to receive digital signals corresponding to the current water temperature and the available usage time of remaining hot water of the water heating apparatus and convert them into a display control signal, and then provide the display control signal to the display drive circuit connected thereto, the display drive circuit converts the received display control signal into a liquid crystal drive signal and provides the liquid crystal drive signal to the liquid crystal display screen connected to the display drive circuit. Thus, the water heating apparatus can display the current water temperature and the available usage time of remaining hot water, facilitating usage and adjustment of the user.

Figure 8:
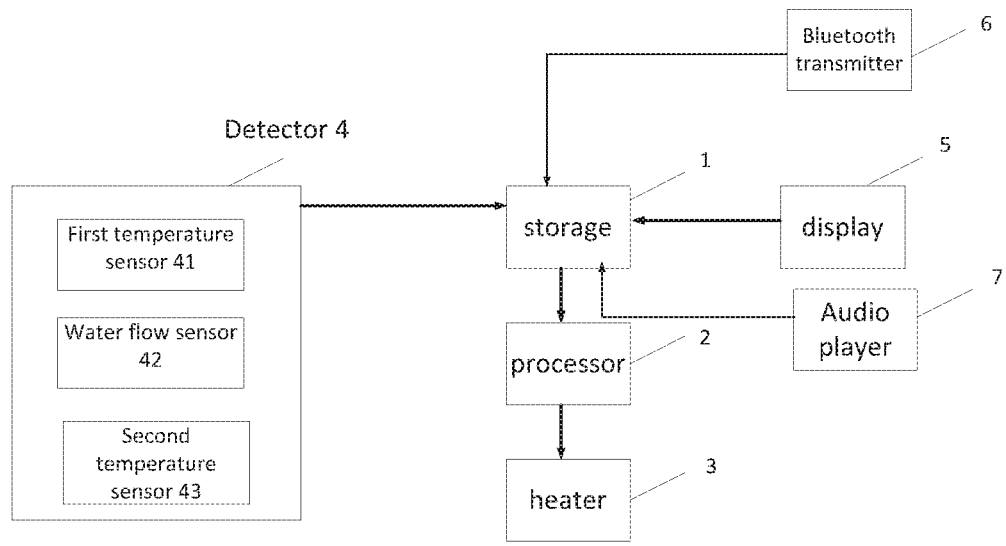
FIG. 8 shows a structural diagram of another water heating apparatus in accordance with an embodiment of the present disclosure.

FIG. 8 shows a structural diagram of another water heating apparatus in an embodiment of the present disclosure. As shown in FIG. 8, the water heating apparatus of the present embodiment may comprise a display 5, a Bluetooth transmitter 6 and an audio player 7 which are connected to the storage 1, the display 5 may receive and play a media file transmitted from the storage 1, the Bluetooth transmitter 6 may be connected to an external terminal to receive a media file transmitted from the external terminal and provide it to the storage 1, the audio player 7 may receive and play the media file transmitted from the storage 1. With the water heating apparatus of the present embodiment, the user can watch videos, listen to music, make phone calls and so on while using the water heating apparatus, which improves user's experiences.

Figure 9:
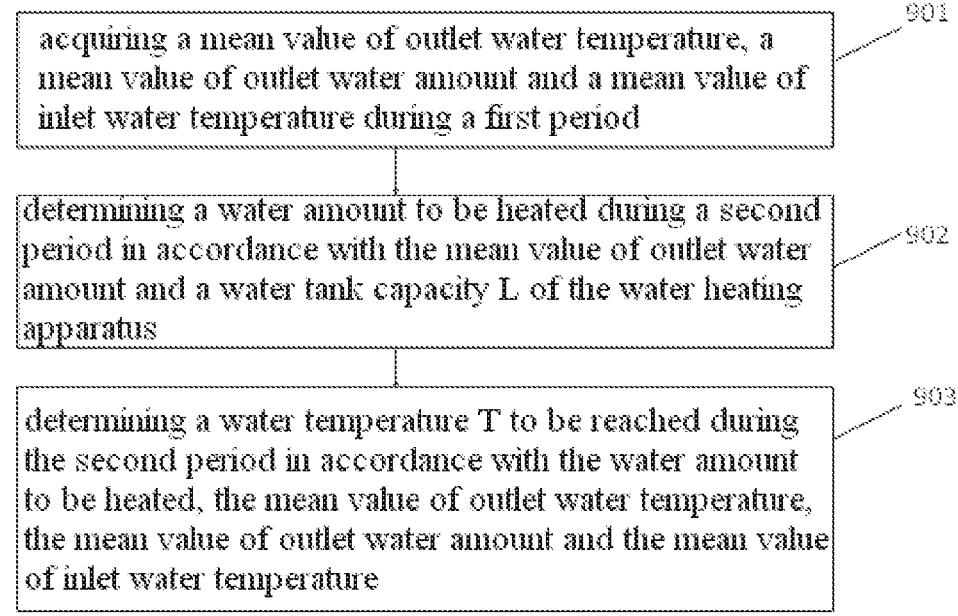
FIG. 9 shows a diagram of a control method of a water heating apparatus in accordance with an embodiment of the present disclosure.

Based on the same concept, the present disclosure further provides a control method of a water heating apparatus. FIG. 9 shows a diagram of a control method of a water heating apparatus in an embodiment of the present disclosure. As shown in FIG. 9, the control method of the water heating apparatus comprising steps of: S901, acquiring a mean value of outlet water temperature $T_H$, a mean value of outlet water amount $L_U$ and a mean value of inlet water temperature $T_L$ of the water heating apparatus during a first period; S902, determining a water amount $L_X$ to be heated during a second period in accordance with the mean value of outlet water amount $L_U$ and a water tank capacity L of the water heating apparatus; and S903, determining a water temperature T to be reached during the second period in accordance with the water amount $L_X$ to be heated, the mean value of outlet water temperature $T_H$, the mean value of outlet water amount $L_U$ and the mean value of inlet water temperature $T_L$.

The control method of the water heating apparatus in the present embodiment may be executed by an integrated circuit, a single chip or a central processing unit (CPU). The first period may be preset by the user, for example, may be preset as continuous 30 days, that is, values detected by sensors of the water heating apparatus during the continuous 30 days are acquired, or all values detected by the sensors of the water heating apparatus from the time at which the water heating apparatus is first used may be acquired. For example, the control method of the water heating apparatus in the present embodiment is executed by the CPU, the CPU acquires outlet water temperatures, outlet water amount values and inlet water temperatures of the water heating apparatus during the first period, calculates the mean value of outlet water temperature $T_H$, the mean value of outlet water amount $L_U$ and the mean value of inlet water temperature $T_L$ of the water heating apparatus and stores them.

The second period is subsequent to the first period, for example, the first period is from the first day to the thirty day, the second period may be the thirty-first day. Thus, temperature information from the first day to the thirty day is used as samples to calculate the water temperature to be reached at the thirty-first day. Certainly, the water temperature to be reached may be adjusted in accordance with variation of an ambient temperature.

Specifically, the step of determining the water amount $L_X$ to be heated during the second period in accordance with the mean value of outlet water amount $L_U$ and the water tank capacity L of the water heating apparatus includes: determining a first water amount as the water amount $L_X$ to be heated under the condition that a value of $L_U/L$ is less than a first threshold; determining a second water amount as the water amount $L_X$ to be heated under the condition that the value of $L_U/L$ is larger than the first threshold and less than a second threshold; and determining a third water amount as the water amount $L_X$ to be heated under the condition that the value of $L_U/L$ is larger than the second threshold.

The first threshold is less than the second threshold, for example, the first threshold may be 0.5, the second threshold may be 1, and under the condition that the value of $L_U/L$ is less than 0.5, the first water amount is determined as the water amount $L_X$ to be heated, under the condition that the value of $L_U/L$ is larger than 0.5 and less than 1, the second water amount is determined as the water amount $L_X$ to be heated, and under the condition that the value of $L_U/L$ is larger than 1, the third water amount is determined as the water amount $L_X$ to be heated.

The first water amount may be less than the second water amount, the second water amount may be less than the third water amount, and the first water amount, the second water amount and the third water amount may respectively times of the water tank capacity of the water heating apparatus, for example, the first water amount is 0.25·L, the second water amount is 0.5·L and the third water amount is 1·L, that is, under the condition that the value of $L_U/L$ is less than 0.5, the water amount $L_X$ to be heated is 0.25·L, under the condition that the value of $L_U/L$ is larger than 0.5 and less than 1, the water amount $L_X$ to be heated is 0.5·L, and under the condition that the value of $L_U/L$ is larger than 1, the water amount $L_X$ to be heated is 1·L.

Specifically, the step of determining the water temperature T to be reached during the second period in accordance with the water amount $L_X$ to be heated, the mean value of outlet water temperature $T_H$, the mean value of outlet water amount $L_U$ and the mean value of inlet water temperature $T_L$ includes: determining the water temperature $T=(T_H-T_L)L_U/L_X T_L$ according to the conservation principle of heat. That is, by the CPU, the water temperature T to be reached during the second period is calculated in accordance with the acquired mean value of outlet water temperature $T_H$, the mean value of outlet water amount $L_U$ and the mean value of inlet water temperature $T_L$ of the water heating apparatus and the determined water amount $L_X$ to be heated, and then is provided to the heater 3 of the water heating apparatus.

Optionally, the control method of the water heating apparatus in an embodiment of the present disclosure further comprises steps of: acquiring start timings t at which a user starts to use hot water every day during continuous N days and determining a mean value $t_u$ of the starting timings t; determining a heating start timing $(t_u-\Delta_t)$ at $(N+1)^{th}$ day and perform heating by the heater 3 from it at $(N+1)^{th}$ day. Specifically, the CPU acquires the start timings t at which the user starts to use hot water every day during the continuous N days and determining the mean value $t_u$ of the starting timings t so that the heater 3 can perform heating from the heating start timing $(t_u-\Delta_t)$ at $(N+1)^{th}$ day, which can ensure that a certain amount of water can be heated to a certain temperature before the user starts to use hot water, can reduce energy consumption and avoid excessive heating and wasting of electric energy, and is convenient to use for the user.

It should be understood that, the above embodiments are merely exemplary embodiments for explaining principle of the present disclosure, but the present disclosure is not limited thereto. Various modifications and improvements may be made by those ordinary skilled in the art within the spirit and essence of the present disclosure, these modifications and improvements fall into the protection scope of the present disclosure.

The invention claimed is:

1. A control device of a water heating apparatus, comprising a storage, a processor and a heater, wherein, the storage is configured to store a usage state value of the water heating apparatus during a first period and provide the usage state value to the processor connected thereto, the usage state value includes a mean value of outlet water temperature $T_H$, a mean value of outlet water amount $L_U$ and a mean value of inlet water temperature $T_L$, the processor is configured to determine an output value in accordance with the usage state value and provide the output value to the heater connected thereto, the output value includes a water amount $L_X$ to be heated and a water temperature T to be reached, the heater is configured to perform heating during a second period in accordance with the output value from the processor.

2. The control device of claim 1, wherein the processor comprises:
    a comparing part configured to determine a range of $L_U/L$, wherein, L represents a water tank capacity of the water heating apparatus; and
    a water amount determining part configured to determine water amount $L_X$ to be heated in accordance with the range of $L_U/L$ determined by the comparing part.

3. The control device of claim 2, wherein the water amount determining part is configured to determine a first water amount as the water amount $L_X$ to be heated under the condition that $L_U/L$ is less than a first threshold, determine a second water amount as the water amount $L_X$ be heated under the condition that $L_U/L$ is larger than the first threshold and less than a second threshold, or determine a third water amount as the water amount $L_X$ to be heated under the condition that $L_U/L$ is larger than the second threshold, and wherein, the first threshold is less than the second threshold.

4. The control device of claim 3, wherein the water amount determining part comprises a divider, a first comparator, a second comparator, a first inverter, a second inverter, and a logic AND circuit, and wherein, input terminals of the divider are connected to the storage to receive and $L_U$ and L, and $L_U/L$ is output from the divider, an output terminal of the divider is connected to an inverting input terminal of the first comparator and an non-inverting input terminal of the second comparator, an non-inverting input terminal of the first comparator receives the first threshold as an input value thereof, the first comparator is configured to output a high level under the condition that a value of $L_U/L$ is less than the first threshold, an inverting input terminal of the second comparator receives the second threshold as an input value thereof, the second comparator is configured to output a high level under the condition that the value of $L_U/L$ is larger than the second threshold, output terminals of the first comparator and the second comparator are respectively connected to input terminals of the first inverter and the second inverter, output terminals of the first inverter and the second inverter are connected to two input terminals of the logic AND circuit respectively, and the logic AND circuit is configured to output a high level under the condition that the value of $L_U/L$ is larger than the first threshold and less than the second threshold.

5. The control device of claim 4, wherein the water amount determining part further comprises a first multiplier and a first relay, a second multiplier and a second relay, and a third multiplier and a third relay, wherein, a first input terminal of the first relay is connected to an output terminal of the first multiplier, the first multiplier outputs a value of the first water amount, a second input terminal of the first relay is connected to the output terminal of the first comparator, the water amount determining part is configured to output the value of the first water amount under the condition that the value of $L_U/L$ is less than the first threshold, a first input terminal of the second relay is connected to an output terminal of the second multiplier, the second multiplier outputs a value of the second water amount, a second input terminal of the second relay is connected to an output terminal of the logic AND circuit, the water amount determining part is configured to output the value of the second water amount under the condition that the value of $L_U/L$ is larger than the first threshold and less than the second threshold, a first input terminal of the third relay is connected to an output terminal of the third multiplier, the third multiplier outputs a value of the third water amount, a second input terminal of the third relay is connected to an output terminal of the second comparator, the water amount determining part is configured to output the value of the third water amount under the condition that the value of $L_U/L$ is larger than the second threshold.

6. The control device of claim 1, wherein the processor comprises a water temperature determining part configured to determine the water temperature $T=(T_H-T_L)L_U/L_{X+}/T_L$ to be reached.

7. The control device of claim 6, wherein the water temperature determining part comprises a subtractor, a multiplier, a divider and an adder, and wherein, input terminals of the subtractor are connected to the storage to receive $T_H$ and $T_L$, a value of $T_H-T_L$ is output from the subtractor, a first input terminal of the multiplier is connected to an output terminal of the subtractor to receive the value of $T_H-T_L$, a second input terminal of the multiplier is connected to the storage to receive a value of $L_U$, the multiplier is configured to output a value of $(T_H-T_L)L_U$, a first input terminal of the divider is connected to an output terminal of the multiplier to receive the value of $(T_H-T_L)L_U$, a second input terminal of the divider receives $L_X$, and the divider is configured to output a value of $(T_H-T_L)L_U/L_X$, a first input terminal of the adder is connected to an output terminal of the divider to receive the value of $(T_H-T_L)L_U/L_X$, a second input terminal of the adder receives $T_L$, and the adder is configured to output the water temperature $T=(T_H-T_L)L_U/L_{X+}T_L$.

8. The control device of claim 1, wherein, the storage being configured to store the usage state value of the water heating apparatus during the first period includes storing usage state values of the water heating apparatus every day during continuous N days, the heater being configured to perform heating during the second period in accordance with the output value from the processor includes performing heating at $(N+1)^{th}$ day, or from $(N+1)^{th}$ day to $(N+Z)^{th}$ day, and wherein N is a positive integer and Z is an integer larger than 1.

9. The control device of claim 8, wherein, the storage is configured to further store start timings t at which a user starts to use hot water every day during the continuous N days and provide the start timings t to the processor, the processor is configured to determine a mean value $t_u$ of the starting timings t and provide the mean value $t_u$ to the storage, the storage stores the mean value $t_u$, and the processor is configured to receive $t_u$ transmitted from the storage, determine a heating start timing $(t_u-\Delta_t)$ at $(N+1)^{th}$ day and provide it to the heater, and wherein $\Delta_t$ is a time required to perform heating.

10. The control device of claim 8, wherein the heater is configured to perform heating at $(N+1)^{th}$ day in accordance with the output value from the processor, and the output value from the processor is determined in accordance with the usage state values of the water heating apparatus stored from a first day to $N^{th}$ day.

11. The control device of claim 1, further comprising:
a detector which includes a first temperature sensor and a water flow sensor provided at a water outlet of the water heating apparatus, and a second temperature sensor provided at a water inlet of the water heating apparatus.

12. The control device of claim 11, wherein the first temperature sensor is configured to detect outlet water temperatures of the water heating apparatus every day during continuous N days and convert the outlet water temperatures into a first set of electric signals, the water flow sensor is configured to detect outlet water amount values of the water heating apparatus every day during the continuous N days and convert the outlet water amount values into a second set of electric signals, the second temperature sensor is configured to detect inlet water temperatures of the water heating apparatus every day during the continuous N days and convert the inlet water temperatures into a third set of electric signals, the detector is configured to provide the first set of electric signals, the second set of electric signals and the third set of electric signals to the storage, the processor is configured to receive the first set of electric signals, the second set of electric signals and the third set of electric signals transmitted from the storage, determine the mean value of outlet water temperature $T_H$, the mean value of outlet water amount $L_U$ and the mean value of inlet water temperature $T_L$ of the water heating apparatus, and feedback the mean value of outlet water temperature $T_H$, the mean value of outlet water amount $L_U$ and the mean value of inlet water temperature $T_L$ to the storage so that the storage stores the mean value of outlet water temperature $T_H$, the mean value of outlet water amount $L_U$ and the mean value of inlet water temperature $T_L$.

13. A water heating apparatus, comprising the control device of claim 1, and further comprising:
a display connected to the storage, which is configured to receive and display the usage state value of the water heating apparatus stored in the storage, wherein the usage state value of the water heating apparatus includes a current outlet water temperature and an available usage time of remaining hot water of the water heating apparatus.

14. The water heating apparatus of claim 13, further comprising:

a wireless transmitter connected to the storage, which is connected to an external terminal and configured to receive a media file transmitted from the external terminal and provide it to the storage;

an audio player connected to the storage, which is configured to receive and play the media file transmitted from the storage, wherein, the display is configured to further receive and display the media file transmitted from the storage.

15. A control method of a water heating apparatus, comprising steps of:

acquiring a mean value of outlet water temperature $T_H$, a mean value of outlet water amount $L_U$ and a mean value of inlet water temperature $T_L$ of the water heating apparatus during a first period;

determining a water amount $L_X$ to be heated during a second period in accordance with the mean value of outlet water amount $L_U$ and a water tank capacity L of the water heating apparatus; and determining a water temperature T to be reached during the second period in accordance with the water amount $L_X$ to be heated, the mean value of outlet water temperature $T_H$, the mean value of outlet water amount $L_U$ and the mean value of inlet water temperature $T_L$.

16. The control method of claim 15, wherein, the step of determining the water amount $L_X$ to be heated during the second period in accordance with the mean value of outlet water amount $L_U$ and the water tank capacity L of the water heating apparatus includes:

determining a first water amount as the water amount $L_X$ to be heated under the condition that a value of $L_U/L$ is less than a first threshold;

determining a second water amount as the water amount $L_X$ to be heated under the condition that the value of $L_U/L$ is larger than the first threshold and less than a second threshold; or determining a third water amount as the water amount $L_X$ to be heated under the condition that the value of $L_U/L$ is larger than the second threshold, wherein, the first threshold is less than the second threshold.

17. The control method of claim 15, wherein the step of determining the water temperature T to be reached during the second period in accordance with the water amount $L_X$ to be heated, the mean value of outlet water temperature $T_H$, the mean value of outlet water amount $L_U$ and the mean value of inlet water temperature $T_L$ includes:

determining the water temperature $T=(T_H-T_L)L_U/L_X+T_L$.

18. The control method of claim 15, further comprising steps of:

acquiring start timings t at which a user starts to use hot water every day during the continuous N days and determining a mean value $t_u$ of the starting timings t; and determining a heating start timing $(t_u-\Delta_t)$ at $(N+1)^{th}$ day and performing heating from it at $(N+1)^{th}$ day, wherein $\Delta_t$ is a time required to perform heating.

19. The control method of claim 16, further comprising steps of:

acquiring start timings t at which a user starts to use hot water every day during the continuous N days and determining a mean value $t_u$ of the starting timings t; and determining a heating start timing $(t_u-\Delta_t)$ at $(N+1)^{th}$ day and performing heating from it at $(N+1)^{th}$ day, wherein $\Delta_t$ is a time required to perform heating.

* * * * *